United States Patent [19]
Kobayashi

[11] Patent Number: 5,662,966
[45] Date of Patent: Sep. 2, 1997

[54] PROCESS FOR PRODUCING AQUEOUS POLYURETHANE COATING AND COAT THEREFROM

[75] Inventor: Tatsuhiko Kobayashi, Yokohama, Japan

[73] Assignee: Mitsubishi Chemical Corporation, Tokyo, Japan

[21] Appl. No.: 616,304

[22] Filed: Mar. 15, 1996

[30] Foreign Application Priority Data

Mar. 22, 1995 [JP] Japan ..................... 7-062892

[51] Int. Cl.$^6$ .................................... B05D 3/02
[52] U.S. Cl. ................. 427/385.5; 524/591; 524/840; 524/874; 562/587
[58] Field of Search ............... 427/385.5; 524/591, 524/874, 457, 840; 562/587

[56] References Cited

U.S. PATENT DOCUMENTS

| | | | |
|---|---|---|---|
| 3,412,054 | 11/1968 | Milligan et al. | 524/591 |
| 4,006,591 | 2/1977 | Scriven et al. | 524/580 |
| 4,504,648 | 3/1985 | Otani et al. | 528/76 |
| 4,598,121 | 7/1986 | Disteldorf et al. | 427/385.5 |
| 4,722,966 | 2/1988 | Flakus | 524/840 |
| 4,861,825 | 8/1989 | Ernst et al. | 524/839 |
| 4,948,829 | 8/1990 | Mitsuji et al. | 524/457 |
| 5,095,069 | 3/1992 | Ambrose et al. | 524/591 |
| 5,157,069 | 10/1992 | Campbell | 524/500 |
| 5,236,995 | 8/1993 | Salatin et al. | 427/402 |
| 5,342,882 | 8/1994 | Göbel et al. | 427/388.4 |
| 5,387,642 | 2/1995 | Blum et al. | 427/372.2 |

FOREIGN PATENT DOCUMENTS 0 378 671  6/1990  European Pat. Off. .

OTHER PUBLICATIONS

Derwent Publications Ltd., London, GB; AN 93–080454; Abstract (no date).

*Primary Examiner*—Diana Dudash
*Attorney, Agent, or Firm*—Oblon, Spivak, McClelland, Maier & Neustadt, P.C.

[57] ABSTRACT

A process for producing an aqueous polyurethane coating is provided. A polyisocyanate, a polyol and a dimethylol alkane acid of the following formula,

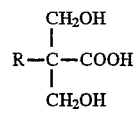

where R is an alkyl group of 2 to 10 carbon atoms, are simultaneously reacted in the presence of an organic solvent having a boiling point of 50° to 120° C. to thereby prepare an urethane polymer solution. The organic solvent is removed from the urethane polymer solution after the polymer has been dissolved or dispersed in water. The coating is of a substantially solvent-free form without reliance on any solvent having a high boiling point which results in impaired coating environment and reduced coat quality. The coat therefrom is widely useful for construction materials, automotive parts, electrical parts and textile products in particular and also is highly effective for preventing volatile of organic compound from becoming emitted in the atmosphere.

20 Claims, No Drawings

PROCESS FOR PRODUCING AQUEOUS POLYURETHANE COATING AND COAT THEREFROM

FIELD OF THE INVENTION

This invention relates to a process for the production of aqueous polyurethane coating and a coat therefrom. More particularly, the invention relates to a process for producing such an aqueous polyurethane coating in which a novel urethane polymer is prepared by the reaction of specific reactants in the presence of a specific organic solvent having a low boiling point and thereafter the solvent is remove and the resultant urethane polymer is dissolved or dispersed in water.

BACKGROUND OF THE INVENTION AND DESCRIPTION OF THE RELATED ART

Aqueous urethane polymers made their debut nearly 20 years ago. For their superior softness, mechanical quality and adhesiveness among various physical properties, such urethane polymers have been used widely in the field of coatings, binders, adhesives and the like. To cope with a recent movement of restricting the emission of volatile of organic compound (VOC) in the air from the viewpoint of environmental protection, for the development and application of aqueous coatings has been demanded strongly.

In order to produce urethane polymers suitable for use in aqueous polyurethane coatings, many attempts have been done to hydrophilize urethane polymers on the ground that hydrophilic groups therein render the high solubility or dispersibility in water. One notable example is an anionic-type urethane polymer which has basic salt of carboxyl groups attached to the prepolymer chain and which enjoys credit since it offers relatively good resistance to water. This type of urethane polymer is obtained by reacting a polyisocyanate, a polyol and dimethylol propionic acid in the mixture of a polar organic solvent having a high boiling point and an organic solvent having a low boiling point so as to form an urethane prepolymer having carboxyl groups and NCO groups at its terminal end, followed by neutralization of the resultant carboxyl groups with a basic material and by subsequent dispersion of the prepolymer in water (see Japanese Patent Publication Nos. 61-5485, 3-48955 and 4-488). After chain extending of the prepolymer with a polyamine compound, the solvents are then removed.

In the prior art methods noted above, the polar solvent having a high boiling point such as dimethylformamide (boiling point: 153° C.), N-methylpyrrolidone (boiling point: 204° C.) or the like should necessarily be used in combination with the organic solvent having a low boiling point in order to dissolve the dimethylol propionic acid uniformly. This latter compound is less soluble in the organic solvent having a low boiling point such as acetone, methyl ethyl ketone or the like. The use of the polar organic solvent having a high boiling point, however, poses the problem that removal or liberation of the solvent from the urethane prepolymer is difficult at a reaction stage after hydrophilization of the urethane prepolymer. It means that the polar solvent having a high boiling point is objectionably left unremoved in the final aqueous urethane polymer. A aqueous coating agent derived from the urethane polymer so formed results in a coat of poor drying. Another serious drawback is that the polar solvent having a high boiling point left in the coat acts like a plasticizer, eventually causing physical deterioration of the coat, or impairing coating environment due to some malodor inherent to that solvent. Moreover, water resistance of the coat is not always satisfactory.

To gain improved solubility of dimethylol propionic acid in the organic solvent having a low boiling point, it has been proposed as disclosed in Japanese Patent Laid-Open No. 6-313024 to use a hydrophilizing material for modifying the OH group of dimethylol propionic acid. The modified dimethylol propionic acid is more readily-soluble in the solvent. The hydrophilizing materials are, for example, a lactone monomer, for example such as ε-caprolactone, and an alkylene oxide such as ethylene oxide. The resulting urethane polymer, however, has still much to be improved with respect to its resistance of water and heat.

A reaction product of a urethane prepolymer and a chain-lengthening agent is also known, as disclosed in Japanese Patent Laid-Open No. 5-39340. The resulting urethane pre-polymer can provide a coat with good resistance of hydrolysis as well as good appearance at low temperatures. Such prepolymer used here is composed of an organic diisocyanate, an amorphous polycarbonate diol and dimethylol propionic acid provided in its molecules with one hydrophilic group and two or more groups capable of reacting with the diisocyanate. The prepolymer, however, has still much to be improved with respect to its folwability and a control of the reaction for producing the prepolymer.

SUMMARY OF THE INVENTION

The present invention has been made to solve or eliminate all of the foregoing problems experienced with the aqueous polyurethane coatings of the prior art which result from use of dimethylol propionic acid and entail some high-boiling solvent put in the reaction system but having remained in the resultant urethane polymer to be unremoved by all possible means.

Therefore, the present invention is to provide a process for producing a new aqueous polyurethane coating earth-friendly and a coating with good resistance of hydrolysis and appearance.

More specifically, the invention provides a process for producing an aqueous polyurethane coating agent, which comprises the steps (1) reacting a polyisocyanate, a polyol and a dimethylol alkane acid of the following formula,

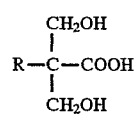

where R is an alkyl group of 2 to 10 carbon atoms, in the presence of an organic solvent having a boiling point of 50° to 120° C. to thereby prepare a urethane polymer solution (2) removing the organic solvent from the urethane polymer solution;

(3) dissolving or dispersing the resultant urethane polymer in water.

The present invention also provides a method of forming a polyurethane coat from an aqueous polyurethane coating, which comprises the steps of:

(1) applying an aqueous polyurethane coating agent to a substrate; and (2) drying the coating supported on the substrate to thereby a dry coat, wherein the aqueous polyurethane coating results from reacting a polyisocyanate, a polyol and a dimethylol alkane acid of the following formula,

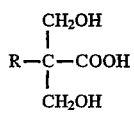

where R is an alkyl group of 2 to 10 carbon atoms, in the presence of an organic solvent having a boiling point of 50° to 120° C. to thereby prepare an urethane polymer solution;

(3) removing the organic solvent from the urethane polymer solution, and (4) dissolving or dispersing the resultant urethane polymer in water.

Also, the present invention is to provide a coat containing not more than 0.1% by weight of the organic solvent.

The above and other objects, features and advantages of the invention will be apparent to those versed in the art from the following description.

DETAILED DESCRIPTION OF THE INVENTION

Urethane Polymers

Urethane polymers useful for the purpose of the present invention are derivable from the reaction of a polyisocyanate, a polyol, a dimethylol alkane acid represented by the following formula,

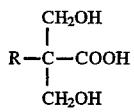

where R is an alkyl group of 2 to 10 carbon atoms, and as an optional member a chain extending agent in the presence of an organic solvent having 50° to 120° C. of boiling point. Generally, the urethane polymer for use in the invention can be obtained by any known method of producing similar polymers, but with the exceptions of use of the above specified organic solvent having a low boiling point alone as a solvent and of the dimethylol alkane acid of the above structural formula.

Two processes described hereunder are typified for the formation of the urethane polymer according to the invention.

1) A polyisocyanate, a dimethylol alkane acid, a polyol and if necessary a chain-extending agent are reacted in the organic solvent having a low boiling point, thereby preparing an urethane prepolymer having carboxyl groups and NCO groups at its treminal end. Thereafter, the carboxyl groups resultantly attached to the prepolymer chain are neutralized with a basic material. The prepolymer is dissolved or dispersed in water and then extended in its chain with a chaine extending agent, followed by removal of the solvent.

2) An urethane prepolymer is prepared by reacting polyisocyanate, polyol and dimethylol alkane acid under the condition of NCO or OH groups in greater excess than others, after which a chain extending is conducted with use of a chain extending agent or a polyisocyanate compound in the organic solvent having a low boiling point. After being neutralized of carboxyl group in the prepolymer incorporated with a basic material, the resulting prepolymer is dissolved or dispersed in water. Finally, the solvent is removed to obtain an aqueous polyurethane coating agent.

The equivalent ratio of NCO groups of the polyisocyanate to OH groups of the polyol is set to be an NCO/OH of 1.1/1 to 30/1.

The polyisocyanate and polyol are reacted in the organic solvent having a low boiling point in such a way that the resulting urethane prepolymer has a solid content of 20 to 90% by weight. This range of solid contents is necessary for facilitating subsequent emulsification and dispersion of the urethane polymer. The solvent here should be easily removable upon hydrophilization of the polymer so that an aqueous polyurethane coating is provided as desired.

Importantly, the organic solvent should have a boiling point of 50° to 120° C., preferably 50° to 110° C., more preferably 50° to 90° C.

Typical organic solvents are chosen from acetone (boiling point: 56.3° C.), methyl ethyl ketone (boiling point: 79.6° C.), methyl isobutyl ketone (boiling point: 117° C.), tetrahydrofuran (boiling point: 66° C.), 1,4-dioxane (boiling point: 101.4° C.), ethyl acetate (boiling point: 76.8° C.), toluene (boiling point: 110.6° C.) and the like. Particularly preferred among these solvents are acetone and methyl ethyl ketone for their good solubility of the urethane polymer and their easy remove or from the reaction system at the second stage. Acetone is most preferred in practicing the invention.

The reaction for obtaining the urethane polymer of the invention may be carried out generally in non-catalyzed condition. This reaction can be accelerated, if desired, by using of a catalyst which is suitably selected from organometallic compounds such as dibutyltin dilaurate, dibutyltin dioctoate, stanneous octoate and the like, and tertiary amines such as triethylenediamine, triethylamine, tributylamine and the like.

Reaction temperatures are usually at from 20° to 120° C. Reaction times depend upon the reaction temperature to be set, the solid content of an urethane polymer to be formed and other parameters at each reaction stage. They are variable and usually from 1 to about 40 hours.

Also importantly, a dimethylol alkane acid of the structural formula written above should be used as one essential reactant or ingredient in producing an urethane polymer of the invention. This specific compound can be derived from aldol condensation of an alkyl aldehyde with formalin in the presence of a base catalyst, followed by oxidation of the resultant aldehyde groups through the action of a peroxide.

Suitable dimethylol alkane acids include dimethylol butanoic acid, dimethylol pentanoic acid, dimethylol heptanoic acid, dimethylol octanoic acid, dimethylol nonanoic acid and the like. Dimethylol butanoic acid, dimethylol heptanoic acid and dimethylol nonanoic acid are favored in view of cost savings and other factors. Dimethylol butanoic acid is most favorable for its emulsification at rather a high level.

In the structural formula of the dimethylol alkane acids according to the invention, the substituent R denotes an alkyl group having a carbon number of 2 to 10. In the case where the alkyl group is one in carbon number, namely the dimethylol propionic acid noted above in connection with the prior art, or 11 or larger, the corresponding dimethylol alkane acid would not sufficiently be soluble in the organic solvent. For instance, the dimethylol butanoic acid contemplated under the invention has been found to show a greater solubility in acetone at 40° C., say as high as 18% by weight, than the dimethylol propionic acid being soluble at too low a level of 2% by weight under the same test conditions.

In the urethane polymer of the invention, the dimethylol alkane acid should be present in an amount of 0.4 to 5% by weight, preferably 0.6 to 4% by weight, more preferably 0.8 to 3% by weight, in terms of the content of carboxyl groups and based on the solid content of the urethane polymer.

The content of carboxyl groups in the urethane polymer, which is closely associated with hydrophilization of the polymer, can be adjusted to suit a particular application, but is set usually at from 0.4 to 5% by weight based on the solid content of the urethane polymer. Less than 0.4% by weight in the content of carboxyl groups would make it difficult to hydrophilize the urethane polymer. More than 5% by weight in like content would produce a physically deteriorated, commercially unacceptable coat. Adjustment of the content of carboxyl groups in the urethane polymer may be effected with the dimethylol alkane acid charged in its varied proportions to a coreactive polyol.

For instance, the content of carboxyl groups (COOH) in dimethylol butanoic acid (DMBA) is calculated from the following equation.

COOH content (%) =

$$[\text{amount of DMBA used}] \times \frac{[\text{amount of molecular weight of COOH (45)}]}{[\text{molecular weight of DMBA (148)}]} \div [\text{total solid content of urethane polymer}] \times 100$$

Suitable polyisocyanates for producing the urethane polymer of the invention include aromatic diisocyanates such as 4,4'-diphenylmethane diisocyanate, 2,4- or 2,6-tolylene diisocyanate, 1,5-naphthalene diisocyanate, p- or m-phenylene diisocyanate and the like, alicyclic diisocyanates such as isophorone diisocyanate, 4,4'-dicyclohexylmethane diisocyanate, 1,4-cyclohexylene diisocyanate, hydrogenates of tolylene diisocyanate and the like, aliphatic diisocyanates such as hexamethylene diisocyanate and the like, xylene diisocyanate, m-tetramethylxylene diisocyanate and the like. These polyisocyanates may be used singly or in combination.

Eligible polyols are exemplified by polyether polyols having preferably of 400 to 5,000 in number-average molecular weight, such as polytetra-methylene ether glycol, polypropylene glycol, polyethylene glycol and the like, bifunctional condensates derived from condensation of a diol with a dicarboxylic acid and terminated with a hydroxyl group, such as polyethylene adipate, polyethylenebutylene adipate, polybutylene adipate, polypropylene adipate, polyhexamethylene adipate, polyneopenthyl adipate, poly-3-methyl-1,5-pentylene adipate and the like, condensates obtained from condensation of a diol with terephthalic acid alone or with isophthalic acid and adipic acid, such as 1,6-hexanediol, 3-methyl-1,5-pentanediol and the like, polyester polyols such as polycaprolactone, polymethylvalerolactone and the like, polycarbonate polyols, silicone polyols, polybutadiene polyols, polyolefin polyols and the like. In use, they may be individual or a combination of two or more polyisocyanates.

When found desirable, the above listed polyols can be used in combination with either one of those compounds chosen from short-chain diols such as ethylene glycol, propylene glycol, diethylene glycol, 1,4-butanediol, neopentyl glycol, 1,6-hexanediol, 3-methyl-1,5-pentanediol and the like, short-chain triols such as trimethylol propane, glycerin and the like, and trifunctional polyols derived by addition of propylene oxide, ethylene oxide, ε-caprolactone and the like to those short-chain triols.

Basic materials for use in neutralizing the carboxyl groups attached to the urethane prepolymer chain are exemplified by tertiary amines such as trimethylamine, triethylamine, methyldiethylamine, tripropylamine and the like, alkanolamines such as dimethylethanolamine, methyldiethanolamine, triethanolamine and the like, and hydroxides and carbonates of alkaline metals such as ammonium, sodium, potassium and the like, among which tertiary amines and alkanolamines are particularly preferred. The basic material is added usually in an equivalent weight of 0.5 to 1 per one equivalent of the carboxyl group attached to the urethane prepolymer.

Chain extending agents for use in extending the chain of the NCO group-terminated urethane prepolymer of the invention include diamines such as ethylenediamine, 1,2-propanediamine, tetraethylenediamine, hexamethylenediamine, 1,4-cyclohexylenediamine, isophorone-diamine, 4,4'-dicyclohexylmethanediamine, m-xylenediamine, phenylenediamine and the like, polyethylene polyamines such as diethylenetriamine, triethylenetetraamine, tetraethylenepentamine and the like, and dihydrazines such as hydrazine, piperazine, hydrazine-adipic acid compounds, hydrazine-phthalic acid compounds and the like. In addition, the short-chain diols and short-chain triols exemplified above may be used where desired. These agents may be used alone or in combination. When the urethane polymer needs to introduce a hydroxyl group to its terminal end, the polyamine referred to here can be used together with ethanolamine or diethanolamine. If hydroxyl groups are desired to be incorporated in the urethane polymer at its backbone, then such polyamine can be used in combination with aminoethyl-aminoethanol or the like.

In forming the urethane polymer according to the invention, a specified organic solvent is employed as described above and required to be removed at the second reaction stage. Liberation of the solvent can be done, for example, by a method in which at temperatures lower than the boiling point of water, usually at from 30° to 100° C., air or nitrogen is blown over or into the resulting liquid reaction product to thereby remove the solvent, by a method in which the reactor is held under vacuum to thereby evaporate the solvent, or by a method in which a distiller of a thin-film type is utilized to collect the solvent.

The present invention, in fact, contemplates providing a substantially solvent-free, aqueous-type urethane polymer for use in the production of an aqueous polyurethane coating. In fields of use where some organic solvent is approvedly made feasible in a limited amount and with accepted ventilation facilities, the solvent so named may be employed in forming an urethane polymer and can be allowed to remain in the ultimate polymer.

To implement the invention, the amount of the low-boiling organic solvent having remained in the urethane polymer should be not more than 10% by weight.

Aqueous Polyurethane Coating

Aqueous polyurethane coatings of the present invention can be produced by the use of the urethane polymers obtained above and, if necessary, after dilution with water and also after blending with various additives described later.

The ultimate coating of the invention has a solid content usually of 10 to 70% by weight. The average particle size of the urethane polymer dispersed in water is not larger than 5 μm, preferably in the range of 0.005 to 2 μm. The appearance of such dispersed polymer is rather variable with its particle size; that is, smaller particle sizes give a fluorescent solution, whereas larger particle sizes lead to a milky emulsion. Both the solution and emulsion, however, afford sufficient stability in character even after lapse of prolonged periods of time. The solid content and viscosity of the coating can be adjusted according to the purpose of use, and in this instance, the urethane polymer is controlled in its size of dispersed particles. The polymer particles dispersed tend to be in a larger size when scarce in the content of hydrophilic groups and to be in a smaller size when abundant in the same content. Further, the urethane polymer has a number-average molecular weight of 3,000 to 50,000. Here, the number-average molecular weight is determinable by dissolving 1% by weight of an urethane polymer sample in tetrahydrofuran and then subjecting the solution to gel permeation chromatography (GPC) and subsequently by converting the resulting numerical value in terms of polystyrene.

Application of Aqueous Polyurethane Coatings

The aqueous polyurethane coating of the present invention is suitably useful for various purposes. Though applicable as it is in a one-pack fashion, this coating is preferably used as a two-pack coating with addition of a crosslinking agent so as to attain improved durability. Such agent is chosen from aqueous blocking-typepolyisocyanate crosslinking agents; water-dispersible, NCO group-nonblocking polyisocyanate crosslinking agents; melamine-based crosslinking agents; epoxy-based crosslinking agents; polyaziridine-based crosslinking agents and the like. The amount of the crosslinking agent to be added depends on the quality and durability required for the purpose of use and on the kind of those agents used, but ranges preferably from 100:1 to 100:40, more preferably from 100:5 to 700:30 in a weight ratio based on the solid content of the urethane polymer that predominates in the coating. Smaller weight ratios than 100:1 would be ineffective to attain improved performance and durability of the final coat, while larger weight ratios than 100:40 would result in a coat of excessive hardness and objectionable fragility.

The aqueous polyurethane coating of the invention may be blended with various additives which include antioxidants, ultraviolet stabilizers, pigments, colorants, defoamers, fluidity regulators, repellents, smoothing agents, fillers and the like.

Moreover, the aqueous polyurethane coating of the invention may be incorporated with different dispersions of acrylic-, polyester-, epoxy-, silicone-, fluorine-based resins and the like on condition that those dispersions do not adversely affect the final coating.

Substrates for use in supporting the aqueous polyurethane coating of the invention are selected from, though not restricted to, wood, leather, paper, plastics, metal, ceramics, glass, concrete, woven or knitted fabric, nonwoven fabric and the like. They may be in the form of a film, plate, block, molding, thread or porous material.

After being adjusted in the solid content and viscosity to meet the purpose, the aqueous polyurethane coating can be applied to a given substrate as by a sprayer, brush, roll, bar coater, applicator, doctor blade, comma coater, spin coater, dipping or the like. The thickness of the dry coat is usually in the range of 0.05 to 500 μm which, however, is variable with the use and purpose. Temperatures at which to dry and anneal the coat depend largely upon the purpose of the coat used, the coating equipment used, the thickness of the coat set, the kind and amount of crosslinking agents used and other parameters, but range usually from 20° to 200° C. When faster drying is desired, the temperature is selected at from 60° to 200° C. Drying times may be likewise set and usually from several seconds to 24 hours.

Further advantages afforded by the aqueous polyurethane coating of the invention are that the dry coat obtained above is made substantially free from the organic solvent used. Thus, the content of the solvent left in the dry coat should be held preferably at not more than 0.1% by weight, more preferably at below 0.05% by weight.

An organic solvent having remained in a coat would render the coat mechanically deteriorative and hence less durable. Here, an example is cited in which N-methylpyrrolidone of a hydrophilic class is employed. In such instance, when the resulting coat is immersed in water or placed in hot and humid conditions, the N-methylpyrrolidone solvent having remained in the coat would take in water and thus cause blister at an interface between the coat and the mating substrate, entailing decreased resistance to water.

EXAMPLES

The following examples are provided to further illustrate the present invention. In these examples, all parts and percentages are by weight unless otherwise noted.

Various physical properties tested in the examples were measured by the methods indicated below.

Solid Content

Samples were put in amounts of 1 to 1.5 g into aluminum cups and weighed with precision. Upon drying at 110° C. for one hour, the residue was precisely weighed.

Viscosity

Viscosity at 25° C. was measured on a rotary viscometer (EM type; Tokyo Instruments Co.).

Average Particle Size

Determination was made on a particle size distribution-measuring apparatus (LA-500 type; Horiba Limited.).

Film Quality

An aqueous polyurethane coating was applied by an applicator to a polypropylene releasable paper such that the resultant dry coat had a thickness of about 70 μm. Drying was done at 80° C. for one hour, and the coat was allowed to stand for one day in an environment of 23° C. and 60% RH (relative humidity), after which it was punched into rectangular pieces each of 10 mm ×120 mm. Tensile strength and elongation were measured by the procedure of JIS K5400 and with the use of a tensile tester (Tensilon UTM-III-100 type; Toyo Boldwin Co.).

Adherence

According to the cross-cut test stipulated by JIS K5400, the adhesion of a coat to the mating substrate was examined. An adhesive tape (Cellotape, tradename; Nichiban Co.) was allowed to sufficiently adhere to and over 100 cross-cuts and then held at an angle of 90° to the coated surface, followed by instant backward releasing of the coat. Judgement was done by the number of cross-cuts released.

Solvent Resistance

A coat supported on a plate was scrubbed 5 times with acetone-immersed gauze, and the appearance of the coat was inspected for any change.

Light Resistance

As stipulated in JIS L0842, a coated plate was irradiated with ultraviolet rays for 100 hours at 63°±3° C. on a sunshine fademeter (Suga Test Instruments Co. FAL-3 type). The appearance of the coat was inspected for any change.

Moist heat resistance

A coated plate was allowed to stand in an environment of 70° C. and 95% RH for one week. Any change was inspected in the appearance of the coat.

Example 1

Into a reactor were put 98.8 parts of 4,4'-dicyclohexylmethane diisocyanate, 251.4 parts of polytetramethylene ether glycol of 2,000 in number-average molecular weight, 16.3 parts (0.122 mol) of dimethylol butanoic acid and 91.6 parts of acetone. Reaction was carried out with stirring at 60° C. for 7 hours in a nitrogen stream, whereupon an NCO group-terminated urethane prepolymer was obtained in the form of a uniform transparent solution. This polymer solution was thereafter incorporated with 10.0 parts of triethylamine, 2.0 parts of Tinuvin 144 (light stabilizer; Ciba-Geigy AG) and 69.7 parts of acetone. To the mixture was gradually added 488.0 parts of desalted water to thereby disperse the urethane prepolymer. 7.0 parts of hydrazine hydrate and 87.3 parts of desalted water were then added at 50° C., followed by removal of the acetone under vacuum.

The aqueous urethane polymer (E1) thus formed was a milky emulsion with a solid content of 40%, a viscosity of 30 mPa.s at 25° C. and an average particle size of 0.4 μm. Examination by GPC revealed that such polymer had a number-average molecular weight of 18,000. The ultimate film produced satisfactory results with a tensile strength on break of 28 MPa and an elongation on break of 540%.

Example 2

Into a reactor were put 98.3 parts of 4,4'-dicyclohexylmethane diisocyanate, 125 parts of polytetramethylene ether glycol of 2,000 in number-average molecular weight, 125 parts of 1,6-hexanediol type polycarbonate diol of 2,000 in number-average molecular weight, 18.5 parts of dimethylol butanoic acid and 91.7 parts of acetone. Reaction was made with stirring at 60° C. for 8 hours in a nitrogen stream, thereby obtaining an NCO group-terminated urethane prepolymer as a uniform transparent solution. 11.4 parts of triethylamine, 1.1 parts of Tinuvin 144 and 70.9 parts of acetone were thereafter added to the polymer solution. The mixture was incorporated gradually with 470 parts of desalted water to thereby disperse the urethane prepolymer. 5.6 parts of hydrazine hydrate and 107.4 parts of desalted water were then added at 50° C. to extend that prepolymer in its chain. Subsequent removal of the acetone under vacuum gave an aqueous urethane polymer (E2) as a milky solution.

The above urethane polymer had a solid content of 40%, a viscosity of 120 mPa.s at 25° C. and an average particle size of 0.4 μm. The number-average molecular weight of the urethane polymer was measured to be 20,000 by GPC. The resultant film was 30 MPa in tensile strength on break and 460% in elongation on break.

Example 3

Into a reactor were put 92.5 parts of isophorone diisocyanate, 233.3 parts of polybutylene adipate of 2,000 in number-average molecular weight, 19.7 parts of dimethylol butanoic acid and 86.4 parts of acetone. Reaction was conducted with stirring at 60° C. for 8 hours in a nitrogen stream, thereby obtaining an NCO group-terminated urethane prepolymer as a uniform transparent solution. This prepolymer was thereafter incorporated with 12.8 parts of triethylamine, 1.2 parts of Tinuvin 144 and 119.4 parts of acetone. To the mixture was added gradually 500 parts of desalted water so as to disperse the urethane prepolymer. 28.3 parts of isophoronediamine and 218 parts of desalted water were then added at 30° C. to thereby extend the prepolymer chain. Subsequent removal of the acetone under vacuum led to an aqueous urethane polymer (E3) as a milky solution.

The above urethane polymer had a solid content of 35%, a viscosity of 200 mPa.s at 25° C. and an average particle size of 0.3 μm. The number-average molecular weight of such polymer was determined to be 70,000 by GPC. The resulting film had a tensile strength on break of 28 MPa and an elongation on break of 750%.

Example 4

Into a reactor were put 174.0 parts of 80-TDI (a mixture of 2,4-tolylene diisocyanate and 2,6-tolylene diisocyanate in a weight ratio of 80:20), 83.3 parts of polypropylene glycol of 1,000 in number-average molecular weight, 24.7 parts (0.167 mol) of dimethylol butanoic acid, 69.3 parts of neopentylglycol, 351.3 parts of acetone and 0.18 part of dibutyltin dilaurate. Reaction was made with stirring at 55° C. for 16 hours in a nitrogen stream to thereby obtain an NCO group-terminated urethane prepolymer. This prepolymer was further incorporated with 8.7 parts of neopentylglycol and 8.7 parts of acetone. Reaction was continued for another 8 hours to thereby extend the prepolymer chain. The resulting solution was uniform and transparent. 14.1 parts of dimethylethanol-amine, 200.8 parts of acetone and 1.8 parts of Tinuvin 144 were then added, and the whole was uniformly admixed. Phase transformation was effected by the addition of 872.9 parts of desalted water, and the acetone was removed under reduced pressure, whereupon an aqueous urethane polymer (E4) was obtained as a fluorescent solution.

The above urethane polymer was 30% in solid content and 1,000 mPa.s at 25° C. in viscosity. Its number-average molecular weight was determined to be 12,000. by GPC. The resulting film was 45 MPa in tensile strength on break and 120% in elongation on break.

Example 5

Into a reactor were put 98.3 parts of 4,4'-dicyclohexyl diisocyanate, 250 parts of an OH group-terminated polyester polyol composed of a dicarboxylic acid (terephthalic acid/adipic acid: a mol ratio of 1/1) and 3-methyl-1,5-pentanediol and having a number-average molecular weight of 2,000, 11.1 parts of dimethylol butanoic acid, 4.5 parts of 1,4-butanediol and 91.0 parts of acetone. Reaction was carried out with stirring at 60° C. for 7 hours, whereby an OH group-terminated urethane prepolymer was obtained as a uniform transparent solution. This solution was thereafter incorporated with 7.2 parts of triethylamine, 1.2 parts of Tinuvin 144 and 109.5 parts of acetone. To the mixture was added gradually 300 parts of desalted water so as to disperse the urethane prepolymer. 21.2 parts of isophoronediamine and 93.6 parts of desalted water were then added at 30° C. to thereby extend the prepolymer chain. Removal of the acetone under vacuum provided an aqueous urethane polymer (E5) in milky form.

The above urethane polymer showed a solid content of 50%, a viscosity of 40 mPa.s at 25° C. and an average particle size of 0.5 μm. Its number-average molecular weight was determined to be 35,000 from measurement by GPC. The ultimate film had a tensile strength on break of 34 MPa and an elongation on break of 510%.

Comparative Example 1

The procedure of Example 1 was followed except that 16.3 parts (the same mol) of dimethylol propionic acid was used in place of the dimethylol butanoic acid.

Most of the dimethylol propionic acid remained undissolved, failing to produce any uniform prepolymer.

Comparative Example 2

The procedure of Example 1 was followed except that 16.3 parts (the same mol) of dimethylol propionic acid was substituted for the dimethylol butanoic acid and that 48.5 parts of acetone and 45.8 parts of N-methylpyrrolidone were used.

Reaction was conducted to obtain a uniform transparent urethane prepolymer solution (CE2). An aqueous urethane polymer was likewise prepared.

A milky emulsion was provided which was 40% in solid content, 40 mPa.s at 25° C. in viscosity, 0.4 μm in average particle size and 19,000 in number-average molecular weight. The resultant film was 19 MPa in tensile strength on break and 680% in elongation on break. This comparative film was smaller in strength by far than the inventive film of Example 1.

Comparative Example 3

The procedure of Example 4 was followed except that 22.4 parts (the same mol) of dimethylol propionic acid was substituted for the dimethylol butanoic acid and that 281.0 parts of acetone and 70.3 parts of N-methylpyrrolidone were used.

Reaction was conducted to obtain a uniform transparent urethane prepolymer solution (CE3). An aqueous urethane polymer was likewise prepared.

A fluorescent solution was provided which had a solid content of 30%, a viscosity of 1,400 mPa.s at 25° C. and a number-average molecular weight of 11,000. The film derived from this polymer solution was measured to be 33 MPa in tensile strength on break and 200% in elongation on break. This comparative film was lower in strength than the inventive film of Example 4.

Examples 6 to 10

Performance evaluation was made of various coatings derived from the aqueous urethane polymers prepared in Examples 1 to 5.

Two different crosslinking agents A and B were put to use in conducting these tests. Crosslinking agent A was an aqueous dispersion of a blocking-type polyisocyanate (Mitec, trademark; SW 500, tradename; solid content, 35% by weight; NCO-group content, 4.7% by weight; Mitsubishi Chemical Corp.), while crosslinking agent B was a water-dispersible polyisocyanate compound (solid content, 100% by weight; NCO group content, 18.9% by weight) which was derivable by addition reaction of a hexamethylene diisocyanate trimer and polyethyleneglycol monomethyl-ether in a weight ratio of 100:7.

To improve wettability of the coating with respect to a given substrate, use was made of a surfactant (Surfynol 104; Nisshin Chemical Industry Co., Ltd.).

Desalted water was used to dilute the aqueous urethane polymer.

Titanium oxide (JR 600A; Tayka Corp.) was employed as a pigment in Examples 9 and 10 and also in Comparative Example 5 below.

The aqueous urethane polymer, surfactant, titanium oxide and desalted water were dispersed for 2 hours in a paint shaker in which glass beads were contained, followed by admixing with the crosslinking agents. Thus, an aqueous polyurethane coating was provided. The coating formulations, coating methods and the performance are shown in Table 1.

Comparative Examples 4 and 5

As was done in Examples 6 and 9, performance evaluation was made of two coatings prepared from the aqueous urethane polymers of Comparative Examples 2 and 3 with the procedures and results shown also in Table 1.

The coatings of Comparative Examples 4 and 5 developed some offensive odors attributed to the N-methylpyrrolidone used, hence rendering coating works cumbersome. No such malodors took place out of the coatings of Examples 6 to 10.

The above, inventive and comparative, coatings are now compared in their respective physical properties.

The coatings of Examples 6 to 10 were produced from the aqueous urethane polymers according to the invention. As shown in Table 1, these aqueous urethane polymers were obtained with use of dimethylol butanoic acid as a starting material for polymer formation and without use of any high-boiling solvent. The inventive coatings have been proved to be highly satisfactory in respect of all of the qualities tested. The coatings of Comparative Examples 4 and 5 were derived from dimethylol propionic acid, namely a conventional starting material for polymer formation, and N-methylpyrrolidone, namely solvent having a high boiling point. As evidenced by the results of Table 1, the comparative coatings were insufficient in regard to adherence, solvent resistance and resistance to elevated temperature and humidity. This is probably because such high boiling solvent remained unremoved in the coat.

TABLE 1

(Formulation of coating, Coating method and Evaluation)

|  | Example No. | | | | | Comparative Example No. | |
|---|---|---|---|---|---|---|---|
|  | 6 | 7 | 8 | 9 | 10 | 6 (corresponds to Ex. 6) | 7 (corresponds to Ex. 9) |
| Aqueous polyurethane resin | E1 | E2 | E3 | E4 | E5 | CE2 | CE3 |
| Crosslinking agent | B | A | B | B | A | B | B |
| Formulation of coating (parts by weight) | | | | | | | |
| Aqueous polyurethane resin | 100 | 100 | 100 | 100 | 100 | 100 | 100 |
| Crosslinking agent | 8 | 15 | 10 | 5 | 15 | 8 | 5 |
| Surfactant | 0.06 | 0.07 | 0.09 | 0.07 | 0.07 | 0.06 | 0.07 |
| Titanium dioxide | — | — | — | 1.8 | 2.5 | — | 1.8 |
| Desalted water | 20 | 15 | 50 | 15 | 30 | 20 | 15 |
| Substrate | ABS plate | Glass plate | Glass plate | Steel plate | Steel plate | ABS plate | Steel plate |

TABLE 1-continued (Formulation of coating, Coating method and Evaluation)

|  | Example No. |  |  |  |  | Comparative Example No. | |
|---|---|---|---|---|---|---|---|
|  | | | | | | 6 (corresponds to Ex. 6) | 7 (corresponds to Ex. 9) |
|  | 6 | 7 | 8 | 9 | 10 | | |
| Coating method | AP | AP | SP | BR | AP | AP | BR |
| Thickness of film (μm) | ca. 30 | ca. 30 | ca. 50 | ca. 100 | ca. 30 | ca. 30 | ca. 100 |
| Drying conditions (°C. × hr) | 60 × 0.5  100 × 0.5 | 80 × 0.5 | 80 × 0.5 | 23 × 24 | 80 × 0.5 | 60 × 0.5  100 × 0.5 | 23 × 24 |
| Baking conditions (°C. × hr) | — | 150 × 0.5 | 150 × 0.5 | — | 150 × 0.5 | — | — |
| Odor during coating and drying | almost none | almost none | almost none | almost none | almost none | strong | strong |
| Aging conditions (23° C., 60% RH × day) | 7 | 7 | 7 | 7 | 7 | 7 | 7 |
| Evaluation | | | | | | | |
| Adherence | o | o | o | o | o | x | x |
| Solvent resistance | o | o | o | o | o | x | x |
| Light resistance | o | o | o | Δ | o | o | x |
| Moist heat resistance | o | o | o | o | o | x | x |

Judgement of Evaluation
Adherence: o number of unreleased cross-cut/100 cross-cuts = 96–100, x number of unreleased cross-cut/100 cross-cuts = 0–95
Solvent resistance: o no change in appearance, Δ small damage to coating film, x large damage to coating film
Light resistance: o no change in appearance, Δ little yellowing, x much yellowing
Moist heat resistance: o no change in appearance, x deterioration such as blisters
Note: AP: Applicator, SP: Spraying, BR: Brushing

Examples 11 and 12

In Example 11 the coating (E1) of Example 1 was used and in Example 12 the coating (E4) of Example 4. Under the same conditions as shown in Table 1, each of the coatings was applied by an applicator over a releasable paper of polypropylene (EKR78PD-HM, tradename; Lintec Corp.) such that the film thickness was approximately 70 μm on a dry basis. The coating so applied was dried at 80° C. for one hour and then let to stand in an environment of 23° C. and 60% RH for one day. The resultant coat after being released from the paper was immersed in tetrahydrofuran at room temperature for one day. The extract was subjected to solvent analysis by gas chromatography (GC-14A; Shimadzu Corp.) with the results shown in Table 2.

As regards the results obtained with Example 11, the content of acetone was determined to be substantially nil in the dry coat, about as low as below 0.01%. Likewise, the such content was determined to be in a limited amount of 0.02% in the dry coat of Example 12. These findings are presumably due to the coats of Examples 6 and 9 being highly resistant to elevated temperature and humidity as shown in Table 1.

Comparative Examples 6 and 7

In Comparative Example 6 the coating (CE2) of Comparative Example 2 was employed and in Comparative Example 7 the coating (CE3) of Comparative Example 3. In the same manner as in Examples 11 and 12, two dry coats were prepared and then subjected to solvent extraction. The extract was likewise analyzed with the results shown in Table 2.

The comparative coats each contained a trace of the acetone used in preparing the urethane polymer. However, Comparative Example 6 revealed a large amount of 0.9% of the N-methylpyrrolidone solvent having remained in the coat and Comparative Example 7 a by far larger amount of 8.5%. The results here are presumed to be closely associated with the coats of Comparative Examples 4 and 5 which had been found to involve reduced resistance to elevated temperature and humidity.

TABLE 2

(Formulation of coating, Coating method and Evaluation)

|  | Example No. | | Comparative Example No. | |
|---|---|---|---|---|
|  | | | 6 (corresponds to Ex. No. 11) | 7 (corresponds to Ex. No. 12) |
|  | 11 | 12 | | |
| Aqueous polyurethane resin | E1 | E4 | CE2 | CE3 |
| Crosslinking agent | B | B | B | B |
| Formulation of coating (parts by weight) | | | | |
| Aqueous polyurethane resin | 100 | 100 | 100 | 100 |

TABLE 2-continued (Formulation of coating, Coating method and Evaluation)

|  | Example No. | | Comparative Example No. | |
|---|---|---|---|---|
|  | | | 6 (corresponds | 7 (corresponds |
|  | 11 | 12 | to Ex. No. 11) | to Ex. No. 12) |
| Crosslinking agent | 8 | 5 | 8 | 5 |
| Surfactant | 0.06 | 0.07 | 0.06 | 0.07 |
| Titanium dioxide | — | 1.8 | — | 1.8 |
| Desalted water | 20 | 15 | 20 | 15 |
| Substrate | Polypropylene plate | Polypropylene plate | Polypropylene plate | Polypropylene plate |
| Coating method | Applicator | Brushing | Applicator | Brushing |
| Thickness of film (μm) | ca. 30 | ca. 100 | ca. 30 | ca. 100 |
| Drying conditions (°C. × hr) | 60 × 0.5 100 × 0.5 | 23 × 24 — | 60 × 0.5 100 × 0.5 | 23 × 24 — |
| Odor during coating and drying | almost none | almost none | strong | strong |
| Aging conditions (23° C., 60% RH × day) | 7 | 7 | 7 | 7 |
| Amount of residual solvent in dry film (wt %) | | | | |
| Acetone | <0.01 | 0.02 | <0.01 | 0.03 |
| N-methylpyrrolidone | — | — | 0.9 | 8.5 |

According to the present invention, a substantially solvent-free, aqueous-type urethane polymer is easily obtainable, as stated above, without using any solvent having a high boiling point that could eventually lead to impaired coating environment and reduced coat quality.

The aqueous polyurethane coating of the invention may be widely used for construction materials, automobile parts, wooden articles, electrical parts, textile products and the like. Also advantageously, it is highly effective for reducing VOC against emission in the atmosphere.

What is claimed is:

1. A process for producing an aqueous polyurethane composition, which comprises:

a) simultaneously reacting a polyisocyanate, a polyol and a dimethylol alkane acid of the formula:

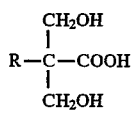

wherein R is an alkyl group of 2 to 10 carbon atoms, in the presence of an organic solvent having a boiling point of about 50° to 120° C., in an amount and for a time and at a temperature effective, to thereby prepare a urethane polymer solution;

b) dissolving or dispersing the resultant urethane polymer in water; and c) removing said organic solvent from said urethane polymer solution, whereby the amount of said organic solvent remaining in said urethane polymer is not more than about 10% by weight.

2. The process according to claim 1, wherein said dimethylol alkane acid is selected from the group consisting of dimethylol butanoic acid, dimethylol pentanoic acid, dimethylol heptanoic acid, dimethylol octanoic acid and dimethylol nonanoic acid.

3. The process according to claim 2, wherein said dimethylol alkane acid is dimethylol butanoic acid.

4. The process according to claim 1, wherein said organic solvent has a boiling point of about 50° C. to 110° C.

5. The process according to claim 4, wherein said organic solvent has a boiling point of about 50° C. to 90° C.

6. The process according to claim 1, wherein said organic solvent is acetone or methyl ethyl ketone.

7. The process according to claim 6, wherein said organic solvent is acetone.

8. The process according to claim 1, wherein the amount of said dimethylol alkane acid used is in the range of about 0.4 to 5% by weight in terms of the content of carboxyl groups.

9. A method of forming a polymer urethane coating from an aqueous polyurethane composition, which comprises:

a) applying an aqueous polyurethane composition to a substrate;

b) drying the composition on said substrate to thereby form a dry coat, wherein the aqueous polyurethane composition results from a process consisting essentially of:

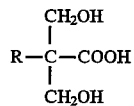

wherein R is an alkyl group of 2 to 10 carbon atoms, in the presence of an organic solvent having a boiling point of about 50° to 120° C., in amounts, and for a time and at a temperature effective, to thereby prepare a urethane polymer solution;

ii) dissolving or dispersing the resultant urethane polymer in water; and iii) removing said organic solvent from the urethane polymer solution, whereby the amount of said organic solvent remaining in said dry coat is not more than about 0.1% by weight.

10. The method according to claim 9, wherein the amount of said organic solvent remaining in said dry coat is not more than about 0.05% by weight.

17

11. The method according to claim 9, wherein said dimethylol alkane acid is selected from the group consisting of dimethylol butanoic acid, dimethylol pentanoic acid, dimethylol heptanoic acid, dimethylol octanoic acid and dimethyl nonanoic acid.

12. The method according to claim 11, wherein said dimethylol alkane acid is dimethylol butanoic acid.

13. The method according to claim 9, wherein said organic solvent has a boiling point of about 50° C. to 110° C.

14. The method according to claim 13, wherein said organic solvent has a boiling point of about 50° C. to 90° C.

15. The method according to claim 9, wherein said organic solvent is acetone or methyl ethyl ketone.

18

16. The method according to claim 9, wherein said organic solvent is acetone.

17. A coat produced by the process of claim 9, wherein the content of the organic solvent having a boiling point of 50° to 120° C. is not more than about 0.1% by weight.

18. The coat according to claim 17, wherein the content of the organic solvent is less than 0.05% by weight.

19. The coat according to claim 17, having a tensile strength on break in a range of about 28 to 45 MPa.

20. The coat according to claim 17, having an elongation on break in a range of about 120 to 750%.

* * * * *